(12) United States Patent
Nalladega et al.

(10) Patent No.: US 11,199,494 B2
(45) Date of Patent: Dec. 14, 2021

(54) INSPECTION SYSTEM AND METHOD

(71) Applicant: General Electric Company,
Schenectady, NY (US)

(72) Inventors: Venkata Vijayaraghava Nalladega,
Niskayuna, NY (US); Carl Stephen Lester, Porter Corners, NY (US);
Michael Mahony, Niskayuna, NY (US)

(73) Assignee: General Electric Company,
Schenectady, NY (US)

( * ) Notice: Subject to any disclaimer, the term of this patent is extended or adjusted under 35 U.S.C. 154(b) by 118 days.

(21) Appl. No.: 16/589,929

(22) Filed: Oct. 1, 2019

(65) Prior Publication Data
US 2021/0096065 A1 Apr. 1, 2021

(51) Int. Cl.
*G01N 21/3563* (2014.01)
*G01N 22/02* (2006.01)
(Continued)

(52) U.S. Cl.
CPC ..... *G01N 21/3563* (2013.01); *G01N 21/8851* (2013.01); *G01N 22/02* (2013.01);
(Continued)

(58) Field of Classification Search
CPC .......... G01N 21/3563; G01N 21/8851; G01N 2223/071; G01N 2223/401; G01N 2223/509; G01N 22/02; G01N 25/72
See application file for complete search history.

(56) References Cited

U.S. PATENT DOCUMENTS 5,417,494 A * 5/1995 Kempa .................. G01N 25/72
219/711
7,220,966 B2 5/2007 Saito et al.
(Continued)

FOREIGN PATENT DOCUMENTS

| CN | 207798707 U | 8/2018 |
| EP | 3014255 A1 | 5/2016 |
| KR | 101769243 B1 | 8/2017 |

OTHER PUBLICATIONS

Osiander et al., Thermal Imaging of Subsurface Microwave Absorbers in Dielectrics Materials, Proceedings SPIE 2245, Thermosense XVI: An International Conference on Thermal Sensing and Imaging Diagnostic Applications, Mar. 21, 1994. (Abstract Only), https://doi.org/10.1117/12.171162.
(Continued)

*Primary Examiner* — David P Porta
*Assistant Examiner* — Fani Boosalis
(74) *Attorney, Agent, or Firm* — Fitch, Even, Tabin & Flannery, LLP

(57) ABSTRACT

An inspection system includes one or more processors and an infrared (IR) camera operably coupled to the one or more processors. The one or more processors control a microwave transmitter to sequentially emit microwaves having different frequencies within a designated frequency range into an object during a first sweep. The IR camera generates thermal image data of the object after the object is heated by each of the different frequencies of microwaves. The one or more processors analyze the thermal image data and determine a selected frequency within the designated frequency range that provides greater heating of the object than one or more other frequencies in the designated frequency range. The one or more processors also analyze select thermal image data of
(Continued)

the object, responsive to heating of the object by the selected frequency of microwaves, to detect an element in the object.

20 Claims, 5 Drawing Sheets

(51) Int. Cl.
    *G01N 21/88*     (2006.01)
    *G01N 25/72*     (2006.01)

(52) U.S. Cl.
    CPC ....... *G01N 25/72* (2013.01); *G01N 2223/071* (2013.01); *G01N 2223/401* (2013.01); *G01N 2223/509* (2013.01)

(56) References Cited

U.S. PATENT DOCUMENTS

| | | |
|---|---|---|
| 7,287,902 B2 | 10/2007 | Safai et al. |
| 8,220,991 B2 * | 7/2012 | Safai .................. G01N 25/72 |
| | | 374/163 |
| 2001/0007571 A1 | 7/2001 | Murphy et al. |
| 2006/0114965 A1 | 6/2006 | Murphy et al. |
| 2017/0023505 A1 | 1/2017 | Maione et al. |
| 2017/0328849 A1 | 11/2017 | Franzini et al. |
| 2018/0356333 A1 | 12/2018 | Shehri et al. |

OTHER PUBLICATIONS

Zhang et al., A Review of Microwave Thermology Nondestructive Testing and Evaluation, Sensors 2017, vol. 17, Issue 5, May 15, 2017, 33 Pages. https://doi.org/10.3390/s17051123.

* cited by examiner

INSPECTION SYSTEM AND METHOD

FIELD

The subject matter described herein relates to non-destructive object inspection.

BACKGROUND

Microwave-enhanced thermography, or microwave thermography, involves directing a high-energy microwave signal onto the surface of an area of interest from a microwave source to heat the area of interest. An infrared (IR) camera generates thermal image data of the resulting heating, which can be analyzed for indications of sub-surface elements within the area of interest. The sub-surface elements, such as defects in a test object, can be detected based on characteristics of a temperature distribution along the surface as depicted in the thermal image data. For example, microwaves that impinge upon a sub-surface element may be absorbed, reflected, or scattered differently than microwaves adjacent to the sub-surface element, such that the sub-surface element may experience a different rate of heating attributable to the microwaves than the adjacent areas of the object. This heating variation may be represented in the temperature distribution depicted in the thermal image data, such that the temperature distribution can be analyzed to detect the presence of the sub-surface element and potentially also to identify the sub-surface element.

The capability and efficiency of using microwave thermography for detecting sub-surface elements, such as defects, in an object is reduced for thicker object structures relative to thin object structures. For example, due to material properties of the object and characteristics of the microwaves, some microwaves may not be able to penetrate a full depth of the area of the interest. Even for microwaves that do penetrate the full depth, the depth may cause degraded resolution, which can decrease the accuracy by causing misdetection and/or misidentification of sub-surface elements. The depth may also cause slower processing times due in part to interference and relatively slow heat transfer rates through the object. Emitting the microwaves towards the object at greater energy levels is an imprecise and inefficient means for attempting to improve the accuracy and efficiency of inspecting thick object structures.

SUMMARY

In one or more embodiments, an inspection system is provided that includes one or more processors and an infrared (IR) camera operably coupled to the one or more processors. The one or more processors are configured to be coupled with a microwave transmitter and to control the microwave transmitter to sequentially emit microwaves having different frequencies within a designated frequency range into an object during a first sweep of the object. The IR camera is configured to generate thermal image data of the object after the object is heated by each of the different frequencies of microwaves during the first sweep. The one or more processors are configured to analyze the thermal image data from the IR camera and determine a selected frequency within the designated frequency range that provides greater heating of the object than one or more other frequencies in the designated frequency range. The one or more processors are also configured to analyze select thermal image data of the object, responsive to heating of the object by the selected frequency of microwaves, to detect an element in the object.

In one or more embodiments, a method is provided that includes performing a first sweep of a microwave transmitter over one or more portions of an object. During the first sweep the microwave transmitter sequentially emits microwaves having multiple different frequencies within a designated frequency range into the object at each of the one or more portions. The method includes generating thermal image data, via an infrared (IR) camera, of each of the one or more portions of the object after being heated by the microwaves having the different frequencies during the first sweep. The method includes determining, for each of the one or more portions of the object, a respective selected frequency within the designated frequency range by analyzing the thermal image data. Microwaves having the selected frequency provide greater heating of the corresponding portion than one or more other frequencies in the designated frequency range. The method also includes analyzing select thermal image data of each of the one or more portions, generated by the IR camera upon heating by microwaves having the corresponding selected frequency, to detect a thermal signature representative of an element in the object. The select thermal image data is either a subset of the thermal image data generated during the first sweep or is generated during a subsequent, second sweep of the microwave transmitter over the one or more portions of the object.

In one or more embodiments, an inspection system is provided that includes a microwave transmitter, one or more processors, and an infrared (IR) camera. The one or more processors are operably coupled to the microwave transmitter and the IR camera. The one or more processors are configured to control the microwave transmitter to emit microwaves into multiple different portions of an object during a first sweep of the object and during a subsequent, second sweep of the object. The IR camera is configured to generate thermal image data of each of the portions of the object after the portions are heated by the microwaves during the first sweep and during the second sweep. During the first sweep, the one or more processors are configured to control the microwave transmitter to sequentially emit microwaves having multiple different frequencies within a designated frequency range into each of the multiple portions such that microwaves having a first frequency within the designated frequency range are emitted into a first portion of the portions during a first time period and microwaves having a second frequency within the designated frequency range are emitted into the first portion during a second time period subsequent to the first time period. The one or more processors are configured to analyze the thermal image data generated by the IR camera during the first sweep to determine, for each of the portions of the object, a respective selected frequency within the designated frequency range which provides greater heating of the corresponding portion of the object than the other frequencies of microwaves emitted into the corresponding portion. During the second sweep, the one or more processors are configured to control the microwave transmitter to emit microwaves having only the respective selected frequency into each corresponding portion of the object.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
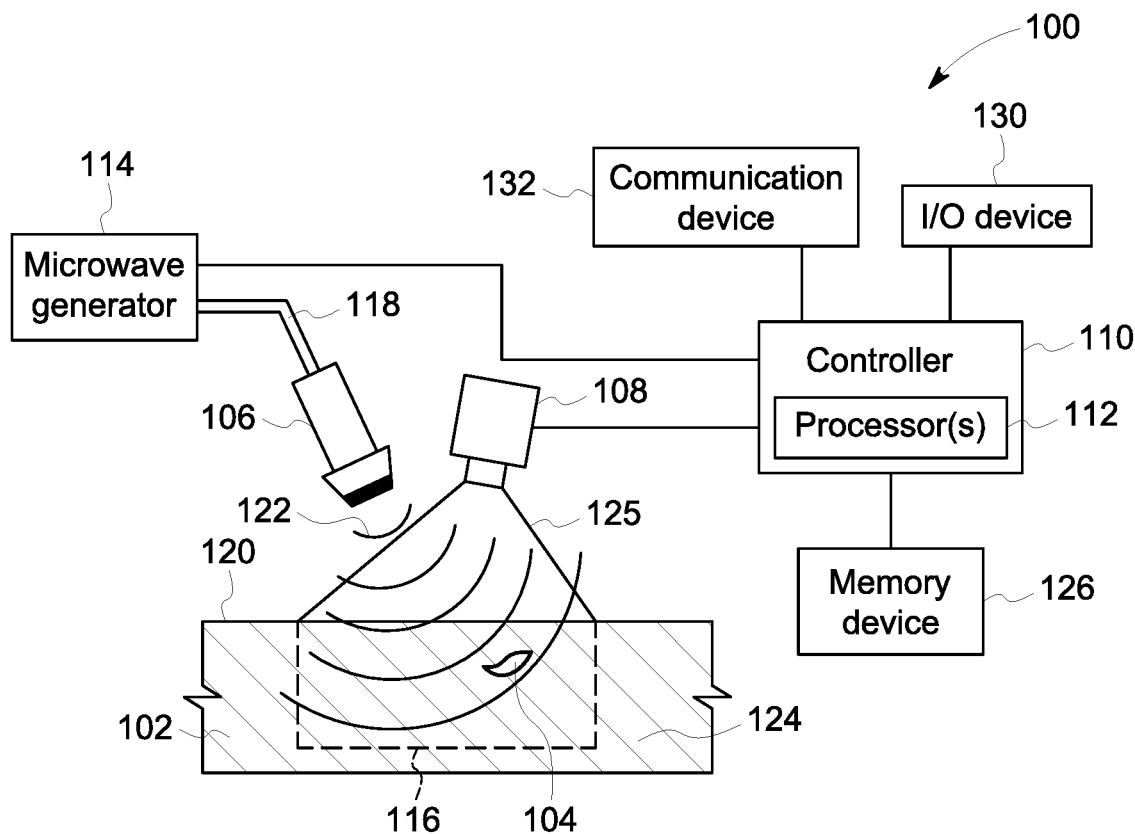
FIG. 1 illustrates an inspection system according to an embodiment.

The embodiments described herein provide an inspection system and method for non-destructively evaluating surface structures of objects for the presence of elements, such as defects, at or below the surface structures. The inspection system and method disclosed utilizes microwave-enhanced thermography. For example, the surface structure of the object is heated by non-contact microwave excitation, and the thermal distribution or signature resulting from the heating is captured in thermal image data using an optical sensor, such as an infrared (IR) camera. The elements that are present may be detected based on recognized characteristics in the thermal signature of the object structure that are indicative of known types of elements. The types of elements may be various types of defects, such as air pockets, delamination, cracks, tears, and the like. The microwaves have the ability to penetrate deep into dielectric materials with little attenuation which allows the system and method disclosed herein to be used for relatively thick non-conductive structures, such as structure layers up to or greater than one inch in thickness. The inspection system and method can be used to detect sub-surface elements beneath the surface of the object. The sub-surface elements may not be visible along the surface of the object, so image-based inspection techniques utilizing visible light may not be able to detect the sub-surface elements. According to one or more embodiments, the inspection system and method is also able to detect surface elements along the surface of the object in addition to the sub-surface elements.

In the embodiments disclosed herein, the accuracy and efficiency of the inspection process is enhanced by individually tuning the characteristics of the microwaves that are used to heat each portion of the object that is inspected, thereby customizing the excitation microwaves for each portion of the object. For example, a respective selected microwave frequency may be determined for each portion of the object based on how well microwaves at different frequencies heat the respective portion of the object. For example, the rate of temperature increase in a respective portion of the object may depend on material properties of the portion (e.g., permittivity, dipole orientation, thermal conductivity, etc.), structural properties of the portion (e.g., coating thickness, surface uniformity, etc.), and characteristics of the microwaves (e.g., energy level, frequency, phase, etc.). The thermal image data that is analyzed for detection of sub-surface elements is the thermal image data generated responsive to heating of the corresponding portion by only those microwaves having the respective selected microwave frequency. Performing thermography inspection of the object based on excitation by microwaves that are specifically selected for each respective portion of the object may provide desirable results, such as increased detection accuracy (due in part to enhanced thermal resolution) and reduced energy consumption. For example, the energy efficiency may be improved because the process determines the frequencies within the designated range that provide the greatest heating efficiency for each portion of the object, and only microwaves using those selected frequencies are used for heating the object to provide the thermal image data for defect analysis. By tuning to determine the selected frequencies, the energy efficiency of the inspection process may be improved and/or the total amount of energy consumed reduced relative to pre-existing microwave thermography techniques.

FIG. 1 illustrates an inspection system 100 according to an embodiment. The inspection system 100 uses microwave-enhanced thermography to perform non-destructive evaluation of an object 102 for detecting sub-surface elements 104 within the object 102. The object 102 is shown in cross-section in FIG. 1. The inspection system 100 includes a microwave transmitter 106, an optical sensor 108, and a controller 110 that has one or more processors 112. In one embodiment, the optical sensor 108 is an infrared (IR) camera that senses the intensity of one or more IR wavelengths of light. Optionally, the optical sensor 108 may sense the intensity of one or more other wavelengths of light.

The controller 110 is operably coupled to both the microwave transmitter 106 and the optical sensor 108 and is configured to control the operation of both devices. For example, the controller 110 is communicatively connected to the microwave transmitter 106 and the optical sensor 108 via one or more wired or wireless communication pathways. The controller 110 generates control signals that are transmitted to the microwave transmitter 106 and the optical sensor 108 via the communication pathways. The controller 110 includes or represents any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein.

The microwave transmitter 106 (also referred to herein as transmitter) is connected to a microwave generator 114 or source. For example, the transmitter 106 and the generator 114 may be components of a common microwave device. The microwave generator 114 generates microwaves that are emitted by the transmitter 106 toward a target area 116 of the object 102. For example, the transmitter 106 may include one or more antennas, lenses, and/or the like for directing the emission of the microwaves towards the target area. The transmitter 106 may be mechanically adjustable and/or electrically adjustable to selectively aim a microwave radiation field 122 emitted therefrom to different target areas. In a non-limiting example, the transmitter 106 may represent a probe that is spaced apart from the microwave generator 114 and mechanically connected to the generator 114 via a cable or cord 118.

The microwaves radiation field 122 emitted by the transmitter 106 impinges upon a surface 120 of the object 102 and penetrate the surface 120 within the target area 116. The target area 116 extends a depth below the surface 120 into the interior of the object 102. The microwaves heat the target area 116. In one or more embodiments, the object 102 has a non-metallic outer structure or coating 124 that is inspected by the inspection system 100. For example, the outer structure 124 may have a composition that includes one or more ceramics, polymers, carbon fibers, glass fibers, and/or various other dielectric materials. The microwaves heat the outer structure 124 via volumetric or dielectric loss heating. For example, the microwave radiation may cause molecules (e.g., dipoles) in the material of the object 102 to vibrate, which generates heat. The heat transfers through the material of the object 102 based on properties of the material such as heat capacity, density, and the like. The optical sensor 108 is used to obtain the temperature variation or distribution in the radiated portion of the object. For example, the optical sensor 108 is positioned to have a field of view 125 of the surface 120 of the object 102 that aligns with the target area 116. The optical sensor 108 generates thermal image data that represents thermal energy radiating from the surface 120. For example, the data represents an intensity of the thermal energy received from the surface 120, such as thermal energy that is reflected and/or radiated therefrom. At least some of the thermal energy is attributable to the microwave-induced heating of the outer structure 124 of the object 102.

When the outer structure 124 of the object 102 has at least one sub-surface element 104, such as a defect, which has a different density, heat capacity, and/or other properties relative to the surrounding material of the outer structure 124, the sub-surface element 104 transfers heat differently than the surrounding material. These thermal variants due to sub-surface elements 104 are reflected in the temperature distribution of the thermal image data generated by the optical sensor 108. For example, some specific types of sub-surface elements 104, such as air pockets, may cause corresponding patterns or signatures in the temperature distribution along the surface 120.

The thermal image data generated by the optical sensor 108 is analyzed by the one or more processors 112 of the controller 110 to detect the presence of sub-surface elements 104. The one or more processors 112 may compare the temperature distribution in the received thermal image data to one or more template distributions that are stored in a memory device 126. The template distributions may be stored in a database, look-up table, or the like. For example, each template distribution may be associated with a specific type of sub-surface element, such as an air pocket, a delamination, a crack, a tear, a metallic foreign object, a water, and/or the like, and the template distribution represents a thermal signature of that sub-surface element. If the temperature distribution in the received thermal image data from the optical sensor 108 has a thermal gradient pattern that matches or corresponds to the thermal signature in one of the template distributions, then the one or more processors 112 detects the presence of a sub-surface element in the object. If the temperature distribution in the received thermal image data does not match or correspond to the thermal signature in any of the template distributions, then the one or more processors 112 determine that the object lacks a sub-surface element. In the illustrated embodiment, the one or more processors 112 are configured to detect the presence of one sub-surface element 104 within the outer structure 124 of the object 102 based on a thermal signature in the thermal image data corresponding to one of the known types of sub-surface elements.

The controller 110 is configured to control the operation of the microwave transmitter 106, microwave generator 114, and optical sensor 108. For example, the controller 110 generates control signals to the microwave generator 114 to control characteristics or properties of the microwaves generated by the generator 114, such as frequency, phase, power level (e.g., amplitude, energy), and the like, including the timing at which to generate the microwaves. The generator 114 may generate the microwaves by various mechanisms such as pseudo-noise, FM chirp, discrete frequencies, and/or the like. The controller 110 generates control signals to the transmitter 106 to aim the microwave radiation field 122. For example, the control signals may automatically mechanically reorient the transmitter 106 relative to the object 102 by rotating (e.g., pivoting, swiveling, etc.) the transmitter 106 about a fixed housing. In another example, the control signals may automatically mechanically move the transmitter 106 along a length of the object 102 to radiate a different portion thereof. In still another example, the microwave radiation field 122 may be aimed electronically by adjusting the phases of the radiofrequency energy emitted by different antenna elements in an array, such as a phased array antenna system. Optionally, the control signals may control movement of a lens or the like of the transmitter 106 to enlarge or shrink a coverage area of the microwave radiation field 122. Optionally, a combination of mechanical and electrical techniques may be used for aiming the microwave radiation field 122 to different portions of the object 102 along the length thereof. The controller 110 generates control signals to the optical sensor 108 to control the generation of thermal image data, such as the timing at which the optical sensor 108 captures thermal radiation from the object 102 to produce the thermal image data. The control signals to the optical sensor 108 may also reorient and/or reposition the optical sensor 108 relative to the object 102 to control which portion of the object 102 is in the field of view 125 of the optical sensor 108 at a given time.

The one or more processors 112 of the controller 110 may operate based on programmed instructions stored in the memory device 126 or hard-wired into the logic of the processors 112. The memory device 126 may store programmed instructions (i.e., software) that dictates the functioning of the controller 110 (e.g., one or more processors 112 thereof). For example, the memory device 126 may store one or more protocols for setting up and operating the inspection system 100 to perform microwave-enhanced thermography along one or more portions of the object 102. The memory device 126 may also store information used by the one or more processors 112 to analyze thermal image data for indications of sub-surface elements, such as the template distributions described above. The controller 110 may implement the programmed instructions to autonomously operate the inspection system 100.

Optionally, the controller 110 is operably connected to an input/output (I/O) device 130 and a communication device 132. The I/O device 130 may include a keyboard, touch-screen, or the like for enabling an operator (e.g., a person) to manually-input commands. The I/O device 130 may also include a display for displaying output information, such as thermal image data generated by the optical sensor 108, alerts, notifications, results of the inspection, and/or the like. The wireless communication device 132 may include circuitry for remote communications. For example, the communication device 132 may provide a network connection that enables remote communication via the Internet, a local area network (LAN), or the like to a remote processing or storage device, such as a server. Alternatively, the communication device 132 may be a wireless communication device that includes a transceiver (or individual transmitter and receiver), an antenna, and associated circuitry for wireless communications.

The object 102 on which the microwave-enhanced thermography is performed may be an industrial work piece in a device, machine, or vehicle. Some non-limiting examples of the object 102 include a rotor blade from a rotor assembly, such as an airfoil of a wind turbine, a turbine blade from an engine, a turbocharger, or the like, or a compressor blade from an engine, a turbocharger, or the like. In another non-limiting example, the object 102 may be a surface component of a vehicle, such as a portion of a wing or of a fuselage of an aircraft. The outer structure 124 of the object 102 may represent a coating, such as a thermal barrier coating. The outer structure 124 may include a non-metallic composite material that includes multiple layers, such as carbon fiber composite materials, glass fiber composite materials, ceramic matrix composite materials, or the like. The embodiments disclosed herein can be used to inspect relatively thick outer structures 124 with thicknesses up to or exceeding one inch. For example, microwaves can penetrate relatively deep into non-metallic materials, and the control steps described herein for tuning the microwaves to the specific portions of the object can enhance the inspection resolution at such depths.

Figure 2:
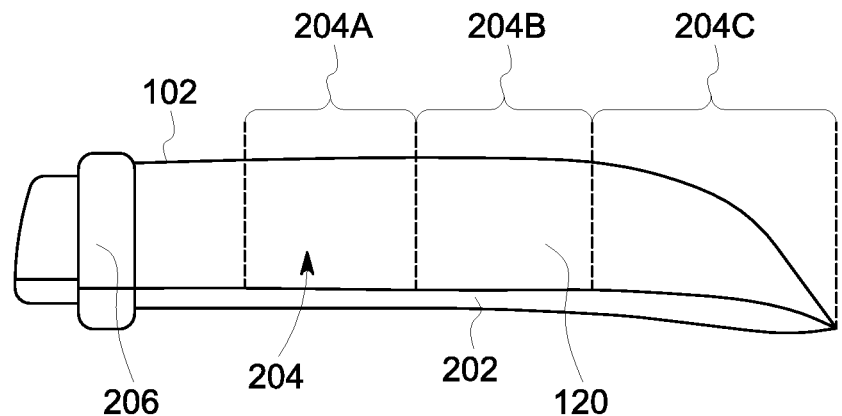
FIG. 2 illustrates an object to be inspected by the inspection system according to an embodiment.

FIG. 2 illustrates the object 102 to be inspected by the inspection system 100 according to an embodiment. The object 102 in FIG. 2 is a rotor blade 202. The object 102 illustrated in FIG. 2 is used to describe an initial stage of the microwave-enhanced thermography inspection method according to an embodiment. The inspection method is performed by the inspection system 100 shown in FIG. 1. The initial stage involves virtually partitioning the object 102 into one or more portions 204. In FIG. 2, the blade 202 is partitioned into three portions 204 along the length of the blade, including a proximal portion 204A, a middle portion 204B, and a distal portion 204C. The middle portion 204B is between the proximal portion 204A and the distal portion 204C along the length. The proximal portion 204A is the closest portion 204 to a base 206 of the rotor blade 202 which couples the blade 202 to a hub. The portions 204A-C may be partitioned to have equal or similar area sizes and/or lengths as one another. The partitioning is virtual such that the portions 204 are determined without making any physical contact with the blade 202.

Although three portions 204A-C are shown in FIG. 2, the blade 202 (or other object) can be partitioned into fewer or greater than three portions based on application-specific considerations. In the simplest example, the inspection system 100 may consider the object 102 to have only a single portion 204, which may be useful if it is known that the inspection region of the object 102 is uniform in material composition and structural composition (e.g., thickness, shape, surface treatment, etc.) along the region. Increasing the number of portions 204 may improve the inspection accuracy, particularly for objects 102 that may have varying material composition and/or structural composition along the inspection region. The number of partitioned portions 204 may be constrained to not exceed a designated limit, such as ten, twenty, or fifty portions, to avoid slowdowns in the inspection process caused by excessive processing demands. Alternatively, instead of partitioning side by side in a row along the length, the object 102 may be partitioned in a column along the width of the object 102 or may be partitioned in an array of both rows and columns. For example, the portions 204 in the array may be virtually tiled on the surface 120 within the area to be inspected.

Figure 3:
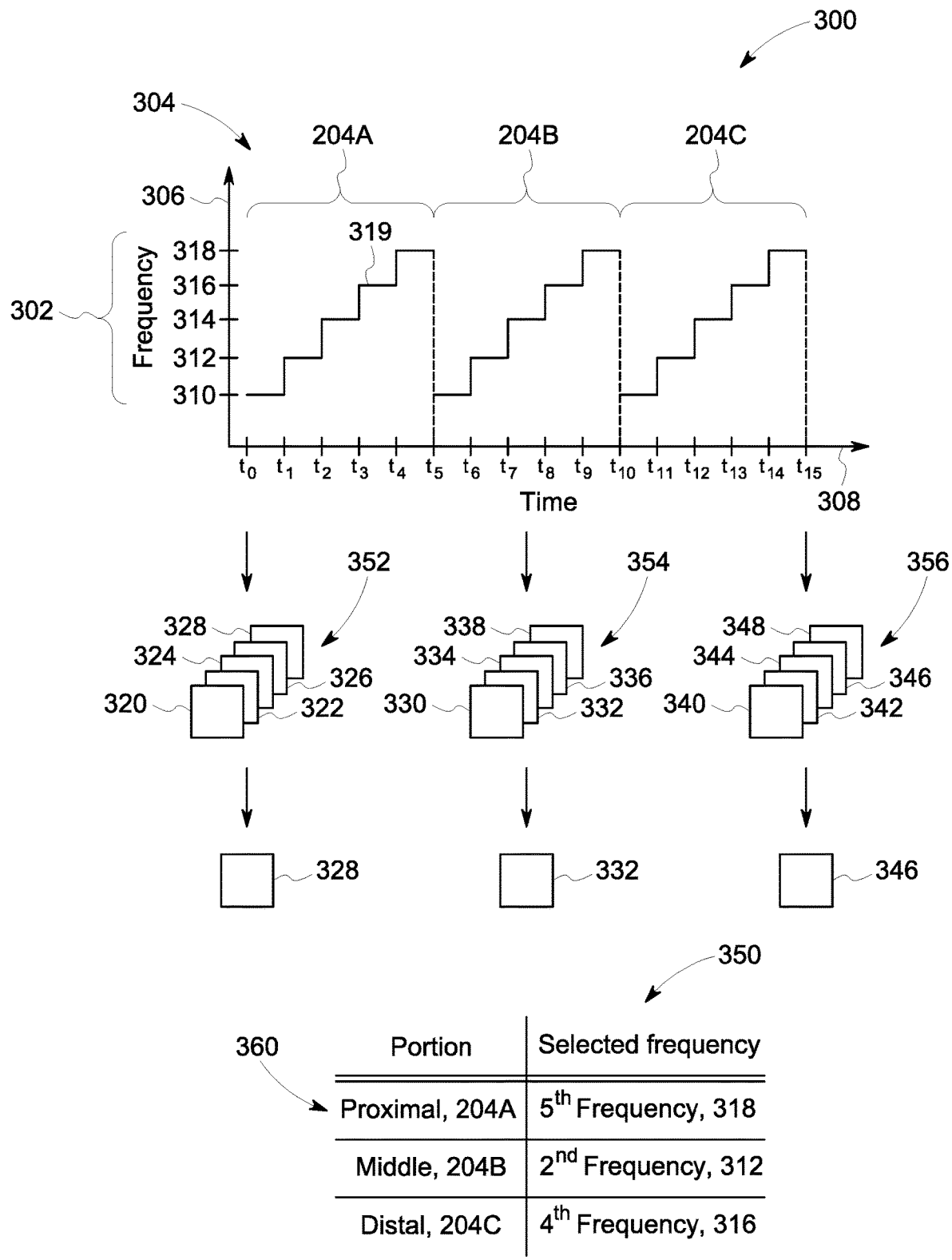
FIG. 3 is a workflow diagram that illustrates a first sweep of a microwave transmitter of the inspection system according to an embodiment.

FIG. 3 is a workflow diagram 300 that illustrates a first sweep of the microwave transmitter 106 of the inspection system 100 according to an embodiment. During the first sweep, the microwave transmitter 106 is controlled by the controller 110 to sequentially and successively emit microwaves having multiple different frequencies within a designated frequency range 302 into each of the portions 204 of the object 102. The workflow diagram 300 includes a graph 304 depicting frequencies of microwaves emitted by the transmitter 106 into the object 102 over time. The vertical axis 306 represent frequency, and the horizontal axis 308 represents time. The transmitter 106 emits microwaves sequentially into the three portions 204A, 204B, 204C of the object 102. For example, the transmitter 106 emits microwaves into the proximal portion 204A during a first time period between times $t_0$ and $t_5$, into the middle portion 204B during a subsequent, second time period from $t_5$ to $t_{10}$, and into the distal portion 204C during a third time period from $t_{10}$ to $t_{15}$. As described above, the transmitter 106 may be controlled to sweep across the different portions 204 over time by rotating to reorient the transmitter 106 relative to the object 102, translating to reposition the transmitter 106 relative to the object 102, and/or modifying electrical characteristics of the microwave radiation field 122 to electrically aim the field 122 to each of the different portions 204 over time.

At each portion 204, the transmitter 106 is controlled to sequentially emit microwaves having different frequencies within the designated frequency range 302. The frequency and other characteristics of the microwaves may be controlled by the microwave generate 114 shown in FIG. 1. The transmitter 106 emits microwaves having a first frequency 310 towards the proximal portion 204A between times $t_0$ and $t_1$. A second frequency 312 of microwaves is subsequently directed towards the proximal portion 204A between times t1 and t2. A third frequency 314 is directed towards the proximal portion 204A next, followed by a fourth frequency 316 and then by a fifth frequency 318 of microwaves. All five frequencies 310, 312, 314, 316, 318 are within the designated frequency range 302. In a non-limiting example, the designated frequency range 302 is between 1.0 GHz and 2.0 GHz. The first through fifth frequencies 310, 312, 314, 316, 318 may be 1.1 GHz, 1.2 GHz, 1.3 GHz, 1.4 GHz, and 1.5 GHz, respectively. The microwaves having the five different frequencies 310, 312, 314, 316, 318 are successively and sequentially emitted into a common portion of the object 102 at different times. For example, the emitted microwaves have only one of the frequencies 310, 312, 314, 316, 318 at each given time. The transmitter 106 may be controlled to sequentially scan through the frequencies 310, 312, 314, 316, 318 in the designated frequency range 302, as indicated by the step-shaped plot line 319 shown in the graph 304.

Although five frequencies 310, 312, 314, 316, 318 are shown in FIG. 3, the transmitter 106 may be controlled to emit microwaves having more or less than five different frequencies in other embodiments. For example, the bounds of the designated frequency range 302 and the number of discrete frequencies tested may be selected based on application-specific factors and considerations. Additional application-specific factors and considerations may include properties such as the durations at which each frequency of microwaves is emitted into the object, the delay or lag timing between the emission of two different frequencies into the same portion of the object, the power or energy level at which the microwaves are emitted from the transmitter 106, and the like. For example, the frequency range 302 and/or other characteristics of the microwaves may be selected to enable the microwaves to penetrate a desired depth into the object 102. The desired depth may represent the thickness of the outer structure 124 that is to be inspected.

After scanning through all of the frequencies 310, 312, 314, 316, 318 in the proximal portion 204A, the microwave transmitter 106 is controlled to repeat the process for the middle portion 204B and then the distal portion 204C. For example, at time t5 the transmitter 106 is controlled to cease emitting microwaves into the proximal portion 204A and begin emitting microwaves into the middle portion 204B. The microwave generator 114 provides the same step-wise progression of the five frequencies 310, 312, 314, 316, 318 for the middle and distal portions 204B, 204C as with the proximal portion 204A. Therefore, each of the five frequencies 310, 312, 314, 316, 318 of microwaves are sequentially emitted into each of the different portions 204A-C of the object 102.

The optical sensor 108 is controlled to generate thermal image data of each of the portions 204A-C of the object 102 after the portions 204A-C are heated by the microwaves during the first sweep. For example, the optical sensor 108 is controlled to generate thermal image data that indicates the heating of the object 102 caused by each of the different frequencies 310, 312, 314, 316, 318 of microwaves within each of the different portions 204A-C. The thermal image data may represent a temperature distribution along the surface 120 of the object 102 within the corresponding portion 204. The thermal image data is used by the one or more processors 112 to determine a selected frequency 350 for each of the portions 204A-C of the object 102.

At the time period from $t_0$ to $t_5$, the optical sensor 108 is positioned and oriented to have a field of view that includes the proximal portion 204A. At or around time $t_1$ (e.g., within a designated buffer time period and before the transmitter 106 emits microwaves having the second frequency 312), the optical sensor 108 generates thermal image data 320 that is associated with the first frequency 310. The thermal image data 320 indicates the thermal energy radiated by the proximal portion 204A attributable to the microwaves having the first frequency 310. At or around time $t_2$, the optical sensor 108 generates additional thermal image data 322 that is associated with the second frequency 312. The optical sensor 108 subsequently generates thermal image data 324, 326, 328 that are associated with the third, fourth, and fifth frequencies 314, 316, 318, respectively, at or around times $t_3$, $t_4$, and $t_5$. All of the thermal image data 320, 322, 324, 326, 328 depicts that same proximal portion 204A of the object 102, although at different times. The image data 320, 322, 324, 326, 328 represents a set 352 that is associated with the proximal portion 204A.

The differences among the thermal image data 320, 322, 324, 326, 328 in the set 352 are attributable to variances in the interactions between the microwaves and the object 102. For example, all of the microwaves may cause the object 102 to heat up, but some frequencies of microwaves may cause the object 102 to heat at different rates and/or achieve different magnitudes of heating than other frequencies.

After time $t_5$, the optical sensor 108 is repositioned to view the middle portion 204B. The optical sensor 108 generates thermal image data 330 at or around time $t_6$ which indicates the thermal energy radiated by the middle portion 204B attributable to heating caused by microwaves having the first frequency 310. The optical sensor 108 generates thermal image data 332 at or around time $t_7$ which indicates the thermal energy radiated by the middle portion 204B attributable to heating caused by microwaves having the second frequency 312. Similarly, the optical sensor 108 proceeds to successively generate thermal image data 334, 336, and 338 at different times which indicate heating of the middle portion 204B caused by microwaves having the third, fourth, and fifth frequencies 314, 316, 318, respectively. The thermal image data 330, 332, 334, 336, 338 represents a set 354 that is associated with the middle portion 204B.

After time $t_{10}$, the optical sensor 108 is repositioned to view the distal portion 204C, and the optical sensor 108 is controlled to successively generate thermal image data indicating radiated thermal energy along the distal portion 204C. Thermal image data 340 is generated at or around $t_{11}$ to indicate heating of the distal portion 204C caused by microwaves having the first frequency 310. The optical sensor 108 is controlled to successively generate thermal image data 342, 344, 346, and 348 at different times which indicate heating of the distal portion 204C caused by microwaves having the second, third, fourth, and fifth frequencies 312, 314, 316, 318, respectively. The thermal image data 340, 342, 344, 346, 348 represents a set 356 that is associated with the distal portion 204C.

The optical sensor 108 therefore generates a respective set of thermal image data for each of the portions 204 of the object 102 to be inspected. In FIG. 3, each of the three sets 352, 354, 356 is analyzed by the one or more processors 112 for determining a respective selected frequency 350 within the designated frequency range 302 for each of the portions 204A-C. The one or more processors 112 are configured to determine the selected frequency 350 based on how well each of the tested frequencies 310, 312, 314, 316, 318 of microwaves heats the corresponding portion 204A, 204B, 204C of the object 102. The selected frequency 350 for each portion 204A-C provides greater heating of the corresponding portion than one or more other frequencies in the designated frequency range 302. The selected frequency 350 may be determined as a frequency that provides greater heating of the corresponding portion than all other frequencies in the range 302. For example, the one or more processors 112 may select one of the five frequencies 310, 312, 314, 316, 318 of microwaves for each portion 204 that provides the greatest amount and/or rate of temperature increase (e.g., steepest temperature gradient) in the allotted time. The temperature increase is determined based on the thermal image data generated by the optical sensor 108.

For the set 352 associated with the proximal portion 204A, the one or more processors 112 may analyze the thermal image data 320, 322, 324, 326, 328. The one or more processors 112 may subtract adjacent image data to generate difference images that indicate the heating attributable to the corresponding frequencies of microwaves. For example, the thermal image data 320 may be subtracted or otherwise compared to a template thermal image of the proximal portion 204A prior to excitation to determine the rate or extend of heating of the proximal portion 204A caused by the first frequency 310. In a non-limiting example, the processors 112 determine that the thermal image data 328 indicates the greatest extent or rate of heating in the set 352, so the fifth frequency 318, which is associated with that thermal image data 328, is determined as the selected frequency 350 of the proximal portion 204A.

Independently from the analysis of the set 352, the one or more processors 112 analyze and compare the thermal image data 330, 332, 334, 336, 338 in the set 354 to determine the selected frequency 350 corresponding to the middle portion 204B. The processors 112 also independently analyze and compare the thermal image data 340, 342, 344, 346, 348 in the set 356 to determine the selected frequency 350 corresponding to the distal portion 204C. In a non-limiting example, the processors 112 determine that the thermal image data 332 indicates the greatest extent or rate of heating in the set 354 and the thermal image data 346 indicates the greatest extent or rate of heating in the set 356. Therefore, the second frequency 312, associated with the thermal image data 332, is determined as the selected frequency 350 of the middle portion 204B, and the fourth frequency 316, associated with the thermal image data 346, is determined as the selected frequency 350 of the distal portion 204C. The three selected frequencies 350 for the corresponding portions 204A-C are shown in a table 360 in FIG. 3. The table 360 indicates that different selected frequencies may be determined for different portions of the same object. For example, the selected frequencies for different portions of the same object may differ due to material variations and/or structural variations between the portions. For example, one portion of the outer structure of an object may have a greater number of composite layers and/or a different composition of one or more layers than another portion, such that the layers react differently to the microwaves.

Optionally, the selected frequencies 350 for the different portions 204 of the object 102 may be determined based on one or more properties of the excitation microwaves other than frequency. For example, in addition to varying the frequency of the microwaves emitted to each of the portions 204, the transmitter 106 may be controlled to sequentially emit microwaves having multiple different power or energy levels during the first sweep. In a non-limiting example, the transmitter 106 emits microwaves having the first frequency 310 and a low power level during a first time period from time $t_0$ to $t_1$, emits microwaves having the first frequency 310 and a medium power level from time $t_1$ to $t_2$, and emits microwaves having the first frequency 310 and a high power level from time $t_2$ to $t_3$. The terms low, medium, and high for the power levels are relative terms. Then, the transmitter 106 emits microwaves having the second frequency 312 and the low power level from time $t_3$ to $t_4$. Thus, in addition to testing the effects of different frequencies, the inspection system 100 may also test different power levels. In this example, the optical sensor 108 is controlled to generate thermal image data at each of the different frequencies 310, 312, 314, 316, 318 and each of the three different power levels, resulting in the set 352 having 15 individual thermal images instead of only five as shown in FIG. 3. The processors 112 determine the selected frequency 350 by analyzing and selecting from among the 15 thermal images.

Figure 4:
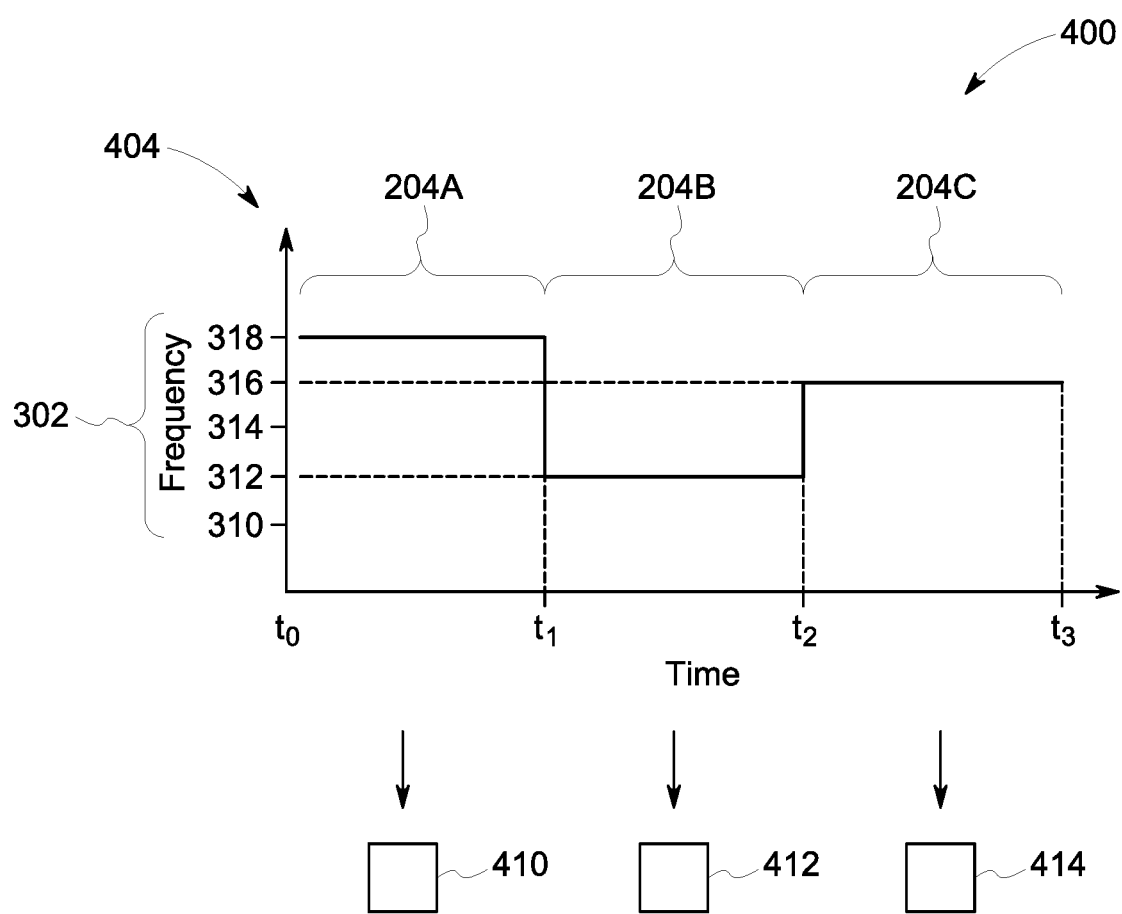
FIG. 4 is a workflow diagram that illustrates a second sweep of the microwave transmitter of the inspection system according to an embodiment.

FIG. 4 is a workflow diagram 400 that illustrates a second sweep of the microwave transmitter 106 of the inspection system 100 according to an embodiment. The workflow diagram 400 includes a graph 404 depicting frequencies of microwaves emitted by the transmitter 106 into the object 102 over time during the second sweep. The microwave transmitter 106 is controlled by the controller 110 during the second sweep to emit microwaves having only the selected frequency 350 into each corresponding portion 204 of the object 102. For example, when the transmitter 106 is positioned to emit microwaves into the proximal portion 204A, the transmitter 106 only emits microwaves having the fifth frequency 318, which represents the selected frequency 350 for the proximal portion 204A. When the transmitter 106 subsequently emits microwaves into the middle portion 204B along the sweep, the microwaves directed to the middle portion 204B only have the second frequency 312, which represents the selected frequency 350 for the middle portion 204B. The transmitter 106 thereafter emits microwaves having only the fourth frequency 316 into the distal portion 204C because the fourth frequency 316 represents the selected frequency 350 for the distal portion 204C.

The optical sensor 108 generates select thermal image data of each portion 204 of the object 102 after being heated by the microwaves during the second sweep. The thermal image data generated during the second sweep is referred to as select thermal image data because it is based on heating caused by the respective selected frequencies 350. For example, the optical sensor 108 is controlled to generate select thermal image data 410 of the proximal portion 204A at or around time $t_1$. The second sweep occurs subsequent to the first sweep described in FIG. 3, so the time $t_1$ in the graph 404 is different than time $t_1$ in the graph 304 shown in FIG. 3. The select thermal image data 410 depicts a temperature distribution along the surface 120 of the object 102 within the proximal portion 204A in response to heating caused by the microwaves having the respective selected frequency 350 (e.g., the fifth frequency 318).

The optical sensor 108 is controlled to generate select thermal image data 412 of the middle portion 204B at or around time $t_2$. The select thermal image data 412 depicts a temperature distribution along the surface 120 of the object 102 within the middle portion 204B in response to heating caused by the microwaves having the respective selected frequency 350 (e.g., the second frequency 312). The optical sensor 108 is controlled to generate select thermal image data 414 of the distal portion 204C at or around time $t_3$. The select thermal image data 414 depicts a temperature distribution along the surface 120 of the object 102 within the distal portion 204C in response to heating caused by the microwaves having the respective selected frequency 350 (e.g., the fourth frequency 316). Thus, the second sweep is performed using only the selected frequencies 350 of microwaves, which were selected based on desirable heating qualities provided by the selected frequencies 350. For example, because the selected frequencies 350 are tuned to the corresponding portions 204 of the object 102, using the selected frequencies 350 to excite the material of the object 102 may provide enhanced resolution of the interior volume of the object 102, which enables more accurate detection of sub-surface elements.

The select thermal image data 410, 412, 414 generated during the second sweep of the microwave transmitter 106 is communicated to and/or accessed by the one or more processors 112. The processors 112 individually analyze the select thermal image data 410, 412, 414 to detect a thermal signature representative of a sub-surface element in the object 102, such as the sub-surface element 104 shown in FIG. 1. As described above with reference to FIG. 1, the processors 112 may analyze each of the select thermal image data 410, 412, 414 by comparing the temperature distribution in each select thermal image data 410, 412, 414 to stored template distributions that are associated with different types of sub-surface elements, such as air pockets, delamination, cracks, tears, metallic foreign objects, water, and/or the like. If the temperature distribution in the select thermal image data 410, for example, has a thermal gradient pattern that matches or corresponds to the thermal signature in one of the template distributions, then the one or more processors 112 detect the presence of a sub-surface element in the proximal portion 204A of the object 102. If the matching template distribution is associated with a crack, then the processors 112 may also identify the detected sub-surface element in the proximal portion 204A as a crack. The processors 112 may independently determine the presence or absence of sub-surface elements in each of the portions 204A-C of the object 102.

In an alternative embodiment, instead of performing the second sweep of the microwave transmitter 106 to emit microwaves into the portions 204A-C of the object 102, the select thermal image data that is analyzed by the processors 112 to detect the presence of sub-surface elements can be a subset of the thermal image data generated during the first sweep. Referring back to FIG. 3, after the processors 112 determine the respective selected frequency 350 for each portion 204A-C, the thermal image data generated during the first sweep based on the heating provided by the selected frequencies 350 can be utilized as the select thermal image data. For example, upon determining that the fifth frequency 318 represents the selected frequency 350 for the proximal portion 204A based on the analysis of the thermal gradient in the thermal image data 328, that thermal image data 328 may be utilized as the select thermal image data. The one or more processors 112 may perform the sub-surface element detection analysis on the thermal image data 328. Similarly, the sub-surface element detection analysis may be performed on the thermal image data 332 for the middle portion 204B and the thermal image data 346 for the distal portion 204C. Thus, the selection of the desirable microwave characteristics for each portion of the object and the sub-surface element detection may be performed on the same image data generated during a single sweep of the object, instead of performing two sweeps.

Figure 5:
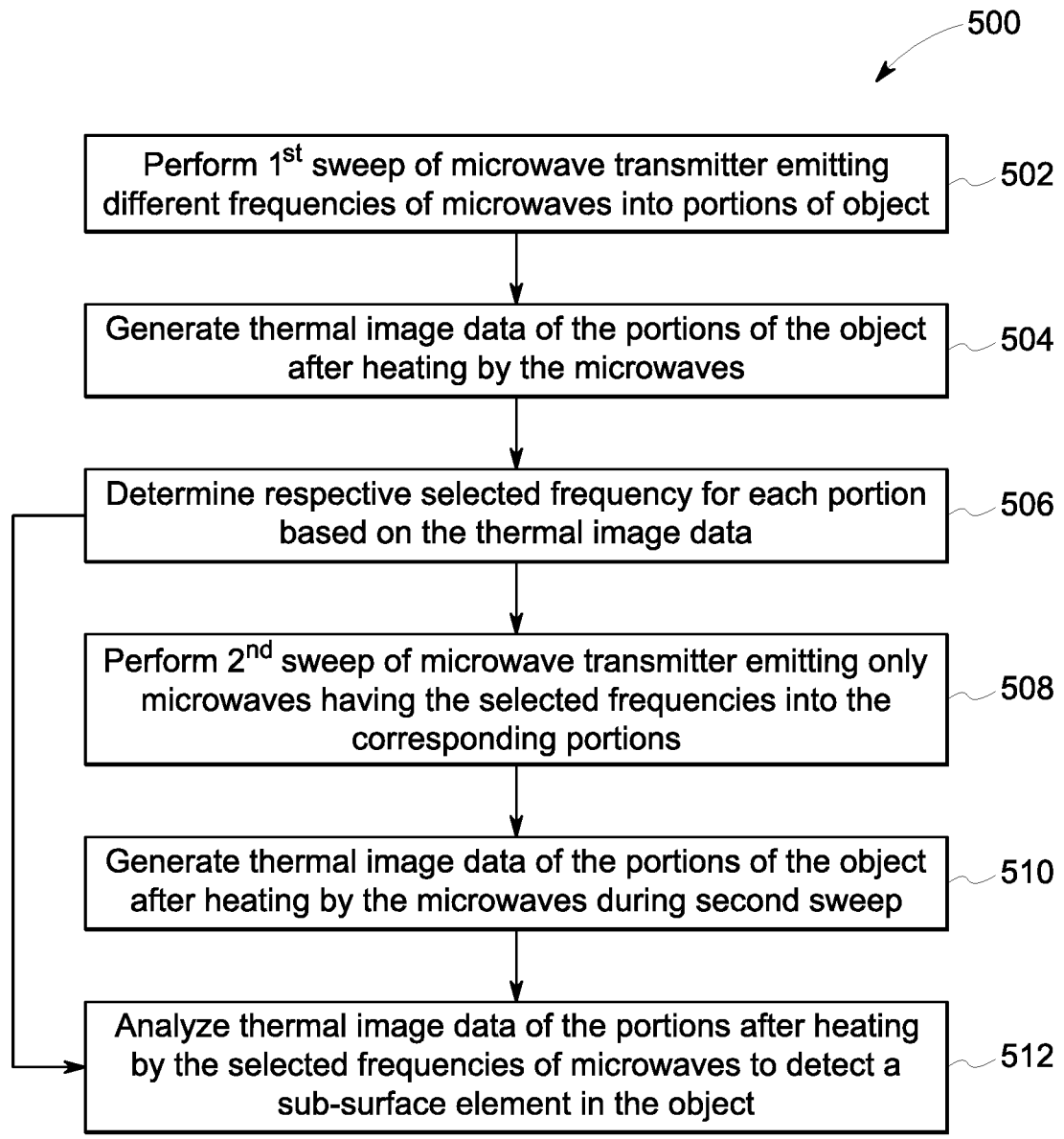
FIG. 5 is a flow chart for a method of inspecting an object according to an embodiment.

FIG. 5 is a flow chart 500 for a method of inspecting an object according to an embodiment. The method may be performed utilizing the inspection system 100 shown in FIG. 1. One or more of the steps of the method may be carried out by the controller 110, or the one or more processors 112 thereof, of the inspection system 100. Optionally, the method may include additional steps not shown in FIG. 5, fewer steps than shown in FIG. 5, different steps than shown in FIG. 5, and/or the steps may be performed in a different order than shown in FIG. 5.

At 502, a first sweep of a microwave transmitter 106 is performed over one or more portions of an object 102. During the first sweep the microwave transmitter 106 sequentially emits microwaves having multiple different frequencies (e.g., frequencies 310, 312, 314, 316, 318) within a designated frequency range 302 into the object 102 at each of the one or more portions 204 (e.g., 204A-C). The different frequency microwaves are sequentially emitted by the microwave transmitter 106 such that microwaves having a first frequency 310 within the designated frequency range 302 are emitted into a first portion 204A of the one or more portions 204 during a first time period and microwaves having a second frequency 312 within the designated frequency range 302 are emitted into the first portion 204A during a second time period that is subsequent to the first time period. Optionally, the microwave transmitter 106 may also be controlled to sequentially emit microwaves having multiple different power levels into each of one or more portions 204 of the object 102.

At 504, thermal image data of each of the one or more portions 204 of the object 102 is generated, via an optical sensor 108, after the one or more portions 204 are heated by the microwaves having the different frequencies during the first sweep. For example, the optical sensor 108 may capture multiple thermal images of the first portion 204A, with each thermal image of the first portion 204A representing a temperature distribution caused by heating from a different frequency of microwaves within the frequency range 302.

At 506, a respective selected frequency 350 within the designated frequency range 302 is determined for each of the one or more portions 204 of the object 102 analyzing the thermal image data. Microwaves having the selected frequency 350 provide greater heating of the corresponding portion than one or more other frequencies in the designated frequency range 302. For example, the selected frequency 350 of microwaves may provide greater heating of the corresponding portion 204 than all of the other frequencies of microwaves in the designated frequency range 302. The respective selected frequency 350 optionally may also be determined based on a depth of penetration of the microwaves emitted into the object 102. For example, only frequencies of microwaves that have the ability to penetrate a desired depth into the object are considered as candidates for representing the selected frequency 350.

Optionally, the method continues to 508, at which a second sweep of the microwave transmitter 106 is performed over the one or more portions 204 of the object 102. During the second sweep the microwave transmitter 106 emits microwaves having only the respective selected frequency 350 into each corresponding portion 204 of the object 102. At 510, select thermal image data (e.g., select thermal image data 410, 412, 414 shown in FIG. 4) of each of the one or more portions 204 of the object 102 is generated, via the optical sensor 108, after being heated by the microwaves during the second sweep. At 512, the select thermal image data of each of the one or more portions 204 is analyzed to detect a thermal signature representative of a sub-surface element 104 in the object 102.

Alternatively, the method from 506 continues directly to 512 without performing the second sweep. For example, the select thermal image data that is analyzed for sub-surface element detection can be a subset of the thermal image data generated during the first sweep, such as the thermal image data 328, 332, 346 shown in FIG. 3.

Figure 6:
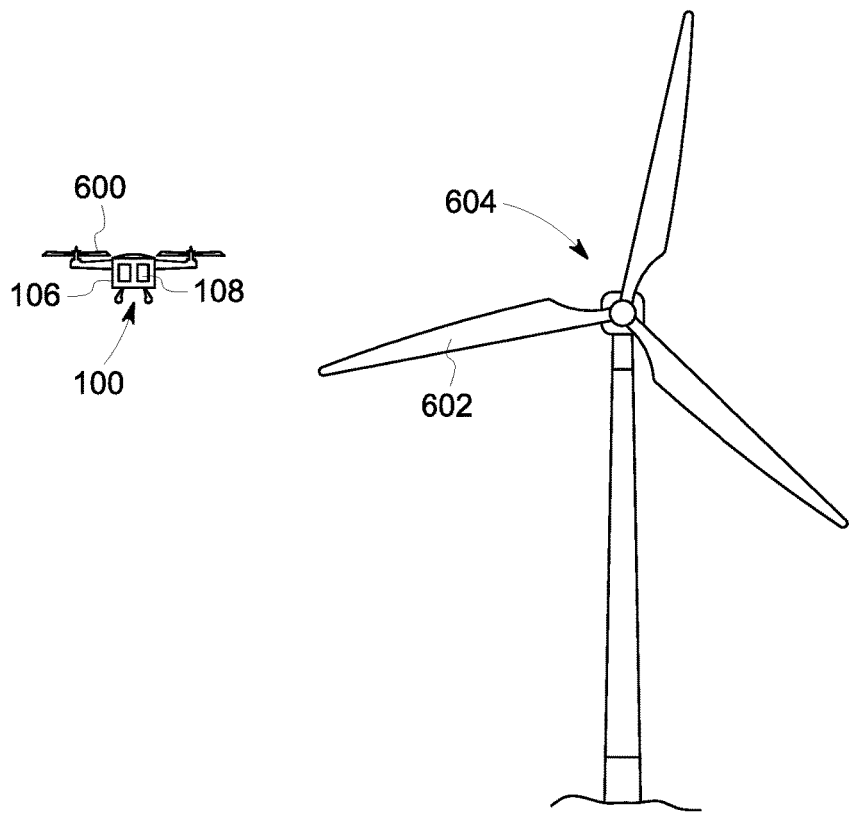
FIG. 6 illustrates a first example use application of the inspection system.

FIG. 6 illustrates a first example use application of the inspection system 100. All, or at least part, of the inspection system 100 is mounted onboard an unmanned aerial vehicle (UAV), or drone 600. For example, the microwave generator 114 (shown in FIG. 1), transmitter 106, and optical sensor 108 are all mounted on the UAV 600. The UAV 600 is controlled to move the transmitter 106 and optical sensor 108 within a proximity range of an object to perform the non-contact inspection of the object according to the process described herein. In the illustrated embodiment, the object is an airfoil 602 of a wind turbine (e.g., windmill) 604. The inspection method described in FIG. 5 may include controlling the UAV 600 to fly proximate to the respective airfoil 602 that is being inspected. The UAV 600 may enable the inspection method to be performed on tall or hard to reach objects and also objects in motion, such as rotating wind turbine airfoils 602.

Figure 7:
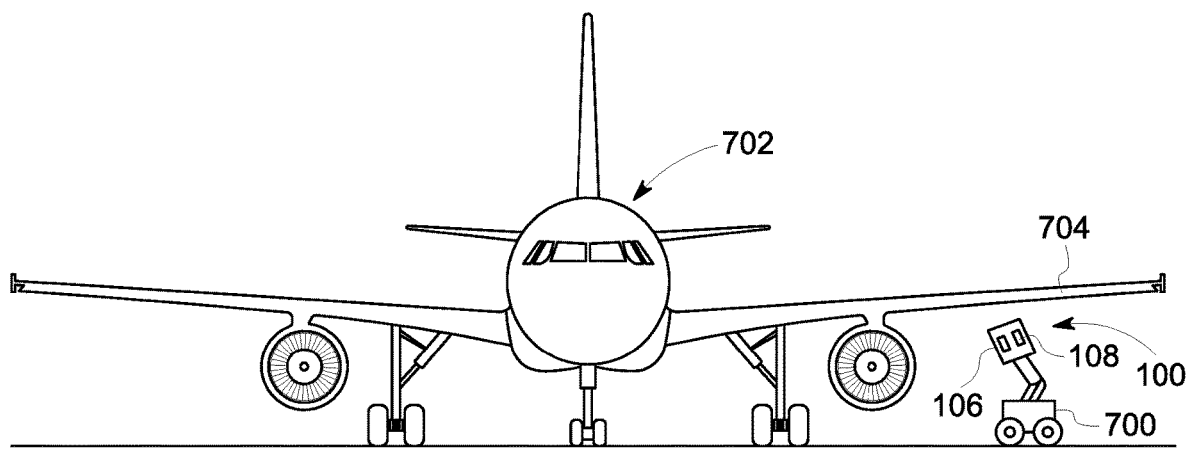
FIG. 7 illustrates a second example use application of the inspection system.

FIG. 7 illustrates a second example use application of the inspection system 100. In FIG. 7, all, or at least part, of the inspection system 100 is mounted onboard a ground-based movable robotic device 700 (referred to herein as robot). For example, the microwave generator 114 (shown in FIG. 1), transmitter 106, and optical sensor 108 are mounted on the robot 700. The robot 700 is controlled to move along the ground to position the transmitter 106 and optical sensor 108 within a proximity range of an object. In the illustrated embodiment, the object is an aircraft 702, such as a wing 704 of the aircraft 702. The inspection method described in FIG. 5 may include controlling the robot 700 to drive along the wing 704 that is being inspected.

At least one technical effect of the embodiments described herein is the ability to perform more accurate and energy efficient detection of elements, such as defects, beneath the surface of an inspected object. Another technical effect is the ability to perform non-contact element detection on objects that have varying material and/or structural compositions, and also on relatively thick outer structures up to or exceeding one inch.

In one or more embodiments, an inspection system includes one or more processors and an infrared (IR) camera. The one or more processors are configured to be coupled with a microwave transmitter and to control the microwave transmitter to sequentially emit microwaves having different frequencies within a designated frequency range into an object during a first sweep of the object. The IR camera is operably coupled to the one or more processors and configured to generate thermal image data of the object after the object is heated by each of the different frequencies of microwaves during the first sweep. The one or more processors are configured to analyze the thermal image data from the IR camera and determine a selected frequency within the designated frequency range that provides greater heating of the object than one or more other frequencies in the designated frequency range. The one or more processors are also configured to analyze select thermal image data of the object, responsive to heating of the object by the selected frequency of microwaves, to detect an element in the object.

Optionally, the select thermal image data is either a subset of the thermal image data generated during the first sweep or is generated during a subsequent, second sweep of the microwave transmitter over the object.

Optionally, the one or more processors are configured to detect the element in the object by identifying a thermal signature in the select thermal image data that is representative of a type of element.

Optionally, the one or more processors are configured to control the microwave transmitter to emit the microwaves having the different frequencies into a common portion of the object at different times.

Optionally, the one or more processors are configured to control the microwave transmitter to emit the microwaves having the different frequencies into each of multiple different portions of the object during the first sweep of the microwave transmitter.

Optionally, the selected frequency is a first selected frequency that corresponds to a first portion of the multiple different portions of the object. The IR camera is configured to generate thermal image data of a second portion of the object after the second portion is heated by each of the different frequencies of microwaves during the first sweep. The one or more processors are configured to analyze the thermal image data of the second portion and determine a second selected frequency within the designated frequency range corresponding to the second portion. The second selected frequency provides greater heating of the second portion than one or more other frequencies in the designated frequency range.

Optionally, prior to analyzing the select thermal image data, the one or more processors are configured to control the microwave transmitter to perform a second sweep over the object such that the microwave transmitter emits microwaves having only the selected frequency into the object. The IR camera is configured to generate the select thermal image data of the object after being heated by the microwaves during the second sweep.

Optionally, the one or more processors are also configured to control the microwave transmitter to sequentially emit microwaves having multiple different power levels into the object during the first sweep of the object. Optionally, the IR camera is configured to generate thermal image data of the object after the object is heated by each of the different frequencies of microwaves at each of the different power levels during the first sweep.

Optionally, the one or more processors are configured to control the microwave transmitter to emit microwaves that penetrate through a surface coating on the object. The surface coating is thicker than one inch.

Optionally, the one or more processors are configured to determine the selected frequency for the object based on which frequency of microwaves within the designated frequency range provides greatest heating of the object.

Optionally, the inspection system also includes an unmanned aerial vehicle. The microwave transmitter and the IR camera are mounted to the unmanned aerial vehicle.

In one or more embodiments, a method includes performing a first sweep of a microwave transmitter over one or more portions of an object. During the first sweep the microwave transmitter sequentially emits microwaves having multiple different frequencies within a designated frequency range into the object at each of the one or more portions. The method includes generating thermal image data, via an infrared (IR) camera, of each of the one or more portions of the object after being heated by the microwaves having the different frequencies during the first sweep. The method also includes determining, for each of the one or more portions of the object, a respective selected frequency within the designated frequency range by analyzing the thermal image data. Microwaves having the selected frequency provide greater heating of the corresponding portion than one or more other frequencies in the designated frequency range. The method includes analyzing select thermal image data of each of the one or more portions, generated by the IR camera upon heating by microwaves having the corresponding selected frequency, to detect a thermal signature representative of an element in the object. The select thermal image data is either a subset of the thermal image data generated during the first sweep or is generated during a subsequent, second sweep of the microwave transmitter over the one or more portions of the object.

Optionally, the microwaves having the different frequencies are sequentially emitted by the microwave transmitter such that microwaves having a first frequency within the designated frequency range are emitted into a first portion of the one or more portions during a first time period and microwaves having a second frequency within the designated frequency range are emitted into the first portion during a second time period that is subsequent to the first time period.

Optionally, prior to analyzing the select thermal image data, the method further includes performing the second sweep of the microwave transmitter over the one or more portions of the object. During the second sweep the microwave transmitter emits microwaves having only the respective selected frequency into each corresponding portion of the object. The method also includes generating, via the IR camera, the select thermal image data of each of the one or more portions of the object after being heated by the microwaves during the second sweep.

Optionally, determining the respective selected frequency for each of the one or more portions of the object includes determining which frequency of microwaves within the designated frequency range provides greater heating of the corresponding portion than all of the other frequencies of microwaves in the designated frequency range.

Optionally, the respective selected frequency for each of the one or more portions of the object is also determined based on a depth of penetration of the microwaves emitted into the object.

Optionally, during the first sweep the microwave transmitter also is controlled to sequentially emit microwaves having multiple different power levels into each of one or more portions of the object.

Optionally, the method also includes mounting the microwave transmitter and the IR camera on an unmanned aerial vehicle and controlling the unmanned aerial vehicle to fly proximate to the object.

Optionally, the method also includes mounting the microwave transmitter and the IR camera on a ground-based movable robotic device and controlling the ground-based movable robotic device to move proximate to the object.

In one or more embodiments, an inspection system includes a microwave transmitter, one or more processors, and an infrared (IR) camera. The one or more processors are operably coupled to the microwave transmitter and configured to control the microwave transmitter to emit microwaves into multiple different portions of an object during a first sweep of the object and during a subsequent, second sweep of the object. The IR camera is operably coupled to the one or more processors and configured to generate thermal image data of each of the portions of the object after the portions are heated by the microwaves during the first sweep and during the second sweep. During the first sweep, the one or more processors are configured to control the microwave transmitter to sequentially emit microwaves having multiple different frequencies within a designated frequency range into each of the multiple portions such that microwaves having a first frequency within the designated frequency range are emitted into a first portion of the portions during a first time period and microwaves having a second frequency within the designated frequency range are emitted into the first portion during a second time period subsequent to the first time period. The one or more processors are configured to analyze the thermal image data generated by the IR camera during the first sweep to determine, for each of the portions of the object, a respective selected frequency within the designated frequency range which provides greater heating of the corresponding portion of the object than the other frequencies of microwaves emitted into the corresponding portion. During the second sweep, the one or more processors are configured to control the microwave transmitter to emit microwaves having only the respective selected frequency into each corresponding portion of the object.

Optionally, the one or more processors are configured to analyze the thermal image data generated by the IR camera during the second sweep to detect a thermal signature representative of an element in the object.

Optionally, the one or more processors are configured to mechanically aim the microwave transmitter during the first sweep to emit the microwaves into each of the multiple portions of the object.

Optionally, the one or more processors are configured use a phased array antenna system to electrically aim the microwave transmitter during the first sweep to emit the microwaves into each of the multiple portions of the object.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The above description is illustrative and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An inspection system comprising:
one or more processors configured to be coupled with a microwave transmitter and to control the microwave transmitter to sequentially emit microwaves having different frequencies within a designated frequency range into an object during a first sweep of the object; and an infrared (IR) camera operably coupled to the one or more processors and configured to generate thermal image data of the object after the object is heated by each of the different frequencies of microwaves during the first sweep, wherein the one or more processors are configured to analyze the thermal image data from the IR camera and determine a selected frequency within the designated frequency range that provides greater heating of the object than one or more other frequencies in the designated frequency range, wherein the one or more processors are also configured to analyze select thermal image data of the object, responsive to heating of the object by the selected frequency of microwaves, to detect an element in the object, and wherein, prior to analyzing the select thermal image data, the one or more processors are configured to control the microwave transmitter to perform a second sweep over the object such that the microwave transmitter emits microwaves having only the selected frequency into the object, and the IR camera is configured to generate the select thermal image data of the object after being heated by the microwaves during the second sweep.

2. The inspection system of claim 1, wherein the select thermal image data is either a subset of the thermal image data generated during the first sweep or is generated during the subsequent, second sweep of the microwave transmitter over the object.

3. The inspection system of claim 1, wherein the one or more processors are configured to detect the element in the object by identifying a thermal signature in the select thermal image data that is representative of a type of element.

4. The inspection system of claim 1, wherein the one or more processors are configured to control the microwave transmitter to emit the microwaves having the different frequencies into a common portion of the object at different times.

5. The inspection system of claim 1, wherein the one or more processors are configured to control the microwave transmitter to emit the microwaves having the different frequencies into each of multiple different portions of the object during the first sweep of the microwave transmitter.

6. The inspection system of claim 5, wherein the selected frequency is a first selected frequency that corresponds to a first portion of the multiple different portions of the object, and wherein the IR camera is configured to generate thermal image data of a second portion of the object after the second portion is heated by each of the different frequencies of microwaves during the first sweep, and the one or more processors are configured to analyze the thermal image data of the second portion and determine a second selected frequency within the designated frequency range corresponding to the second portion, the second selected frequency providing greater heating of the second portion than one or more other frequencies in the designated frequency range.

7. The inspection system of claim 1, wherein the one or more processors are also configured to control the microwave transmitter to sequentially emit microwaves having multiple different power levels into the object during the first sweep of the object.

8. The inspection system of claim 7, wherein the IR camera is configured to generate thermal image data of the object after the object is heated by each of the different frequencies of microwaves at each of the different power levels during the first sweep.

9. The inspection system of claim 1, wherein the one or more processors are configured to control the microwave transmitter to emit microwaves that penetrate through a surface coating on the object, the surface coating being thicker than one inch.

10. The inspection system of claim 1, wherein the one or more processors are configured to determine the selected frequency for the object based on which frequency of microwaves within the designated frequency range provides greatest heating of the object.

11. The inspection system of claim 1, further comprising an unmanned aerial vehicle, wherein the microwave transmitter and the IR camera are mounted to the unmanned aerial vehicle.

12. A method comprising:

performing a first sweep of a microwave transmitter over one or more portions of an object, wherein during the first sweep the microwave transmitter sequentially emits microwaves having multiple different frequencies within a designated frequency range into the object at each of the one or more portions;

generating thermal image data, via an infrared (IR) camera, of each of the one or more portions of the object after being heated by the microwaves having the different frequencies during the first sweep;

determining, for each of the one or more portions of the object, a respective selected frequency within the designated frequency range by analyzing the thermal image data, wherein microwaves having the selected frequency provide greater heating of the corresponding portion than one or more other frequencies in the designated frequency range; and analyzing select thermal image data of each of the one or more portions, generated by the IR camera upon heating by microwaves having the corresponding selected frequency, to detect a thermal signature representative of an element in the object, wherein the select thermal image data is either a subset of the thermal image data generated during the first sweep or is generated during a subsequent, second sweep of the microwave transmitter over the one or more portions of the object, and wherein, prior to analyzing the select thermal image data, the one or more processors are configured to control the microwave transmitter to perform a second sweep over the object such that the microwave transmitter emits microwaves having only the selected frequency into the object, and the IR camera is configured to generate the select thermal image data of the object after being heated by the microwaves during the second sweep.

13. The method of claim 12, wherein the microwaves having the different frequencies are sequentially emitted by the microwave transmitter such that microwaves having a first frequency within the designated frequency range are emitted into a first portion of the one or more portions during a first time period and microwaves having a second frequency within the designated frequency range are emitted into the first portion during a second time period that is subsequent to the first time period.

14. The method of claim 12, wherein determining the respective selected frequency for each of the one or more portions of the object includes determining which frequency of microwaves within the designated frequency range provides greater heating of the corresponding portion than all of the other frequencies of microwaves in the designated frequency range.

15. The method of claim 12, wherein the respective selected frequency for each of the one or more portions of the object is also determined based on a depth of penetration of the microwaves emitted into the object.

16. The method of claim 12, wherein during the first sweep the microwave transmitter also is controlled to sequentially emit microwaves having multiple different power levels into each of one or more portions of the object.

17. An inspection system comprising:

a microwave transmitter;

one or more processors operably coupled to the microwave transmitter and configured to control the microwave transmitter to emit microwaves into multiple different portions of an object during a first sweep of the object and during a subsequent, second sweep of the object; and an infrared (IR) camera operably coupled to the one or more processors and configured to generate thermal image data of each of the portions of the object after the portions are heated by the microwaves during the first sweep and during the second sweep, wherein, during the first sweep, the one or more processors are configured to control the microwave transmitter to sequentially emit microwaves having multiple different frequencies within a designated frequency range into each of the multiple portions such that microwaves having a first frequency within the designated frequency range are emitted into a first portion of the portions during a first time period and microwaves having a second frequency within the designated frequency range are emitted into the first portion during a second time period subsequent to the first time period, wherein the one or more processors are configured to analyze the thermal image data generated by the IR camera during the first sweep to determine, for each of the portions of the object, a respective selected frequency within the designated frequency range which provides greater heating of the corresponding portion of the object than the other frequencies of microwaves emitted into the corresponding portion, and wherein, during the second sweep, the one or more processors are configured to control the microwave transmitter to emit microwaves having only the respective selected frequency into each corresponding portion of the object.

18. The inspection system of claim 17, wherein the one or more processors are configured to analyze the thermal image data generated by the IR camera during the second sweep to detect a thermal signature representative of an element in the object.

19. The inspection system of claim 17, wherein the one or more processors are configured to mechanically aim the microwave transmitter during the first sweep to emit the microwaves into each of the multiple portions of the object.

20. The inspection system of claim 17, wherein the one or more processors are configured use a phased array antenna system to electrically aim the microwave transmitter during the first sweep to emit the microwaves into each of the multiple portions of the object.

\* \* \* \* \*